United States Patent
Bayes et al.

[11] Patent Number: 5,092,129
[45] Date of Patent: Mar. 3, 1992

[54] SPACE SUIT COOLING APPARATUS

[75] Inventors: Stephen A. Bayes; George J. Roebelen, Jr., both of Suffield, Conn.

[73] Assignee: United Technologies Corporation, Hartford, Conn.

[21] Appl. No.: 593,599

[22] Filed: Oct. 4, 1990

Related U.S. Application Data

[63] Continuation of Ser. No. 325,426, Mar. 20, 1989, abandoned.

[51] Int. Cl.$^5$ .............................. F25B 21/02
[52] U.S. Cl. ................................. 62/3.3; 62/259.3
[58] Field of Search .......... 62/3.3, 259.3, 259.1, 62/238.3; 126/400

[56] References Cited

U.S. PATENT DOCUMENTS

| | | | |
|---|---|---|---|
| 3,154,926 | 11/1964 | Hirchhorn | 62/259.3 X |
| 3,212,286 | 10/1965 | Curtis | 62/259.3 |
| 4,405,348 | 9/1983 | Pasternack | 62/259.3 |
| 4,662,180 | 5/1987 | Menocal | 62/3 |

FOREIGN PATENT DOCUMENTS 1126426 3/1960 Fed. Rep. of Germany .

OTHER PUBLICATIONS

NASA Tech Brief, entitled "Forced-Flow Evaporative Cooler", Dec. 1987, Wilbert E. Ellis of Johnson Space Center, and Richard E. Niggemann of Sundstrand Corp., 2301 N.T.I.S. Tech Notes (1987) Jun., Dec.

Primary Examiner—Henry A. Bennet
Attorney, Agent, or Firm—Lloyd D. Doigan; Richard H. Kosakowski; William W. Habelt

[57] ABSTRACT

Apparatus for removing heat energy of a cooling medium passing from a space suit liquid cooling garment includes a heat sink assembly for absorbing and rejecting the heat energy and a heat transfer means for transferring the heat energy of the cooling medium to the heat sink assembly. The heat transfer means, which is comprised of an array of thermoelectric modules, regulates the quantity of heat energy transferred from the cooling medium to the heat sink assembly. The heat sink assembly includes a material which isothermally changes phase while absorbing heat energy.

12 Claims, 2 Drawing Sheets fig. 1
fig. 2 prior art
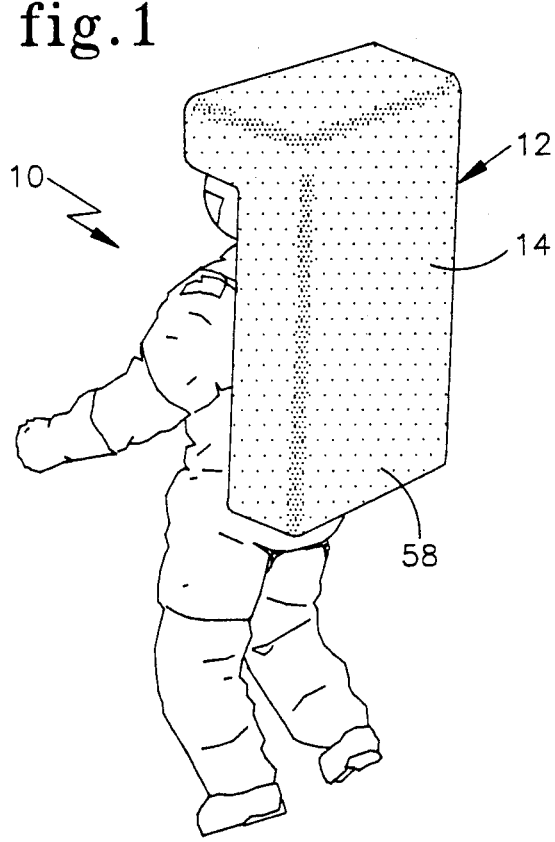
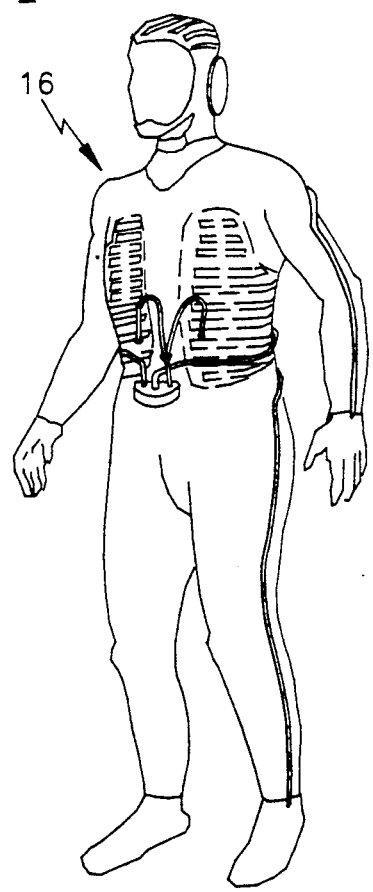
fig. 4
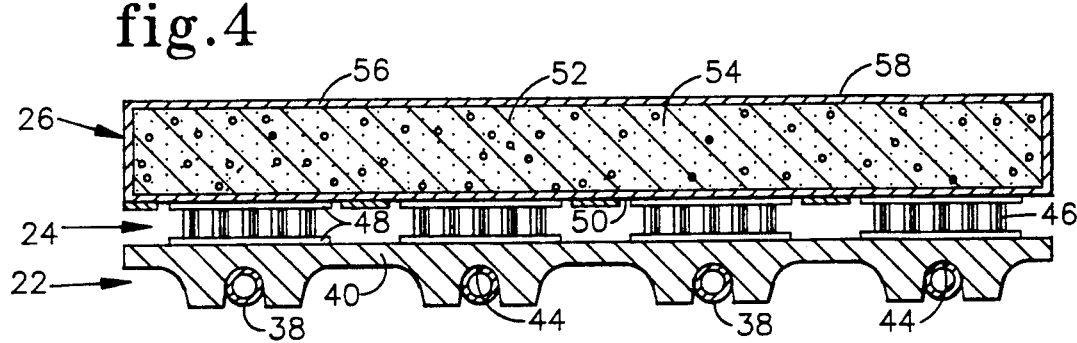

SPACE SUIT COOLING APPARATUS

This is a continuation of application Ser. No. 07/325,426, filed Mar. 20, 1989, now abandoned.

TECHNICAL FIELD

This invention relates to an apparatus for removing heat from the interior of an extravehicular space suit.

BACKGROUND ART

Hermetically sealed space suits typically develop a significant heat load. The heat load must be removed for the comfort of the space suit occupant. The heat load is comprised of several constituents; metabolic heat energy, heat energy absorbed into the suit from the environment, and other electrical and mechanical heat energy. By far, the major portion of the heat load is generated by the occupant's metabolism.

Generally, a liquid cooling garment (LCG), which is designed to remove metabolic heat energy, is worn by the occupant. The LCG generally includes a plurality of tubes strategically placed about the body. The tubes carry a cooling medium, such as water. The cooling medium absorbs the metabolic heat energy and flows to a device which transfers the heat energy therefrom.

Current space suits remove the heat energy generated therein by sublimation. Sublimation occurs when a solid vaporizes without the intermediate formation of a liquid. Water from a separate storage tank is sublimated by exposing it to the vacuum of space. The water is exposed to the vacuum by means of a porous plate which forms part of a heat exchanger. The porous plate traps and freezes the water. The cooling medium, meanwhile, circulates through separate passages within the heat exchanger. The heat energy of the cooling medium sublimates the thin layer of ice producing a small cloud of water vapor. The heating load absorbed by the cooling medium is effectively rejected from the suit thereby. The resulting water vapor is vented to the environment.

While the sublimation process provides the amount of heat removal required, it has several drawbacks: the cost of hauling water into space is prohibitive; the water vapor may condense on mirrors or other sensitive instruments and degrade their performance; and, the water vapor may absorb infrared radiation.

DISCLOSURE OF THE INVENTION

It is an object of the invention to provide a non-venting, long lasting, economical, and efficient cooling device for an extravehicular space suit.

It is a further object of the invention to provide a regenerable cooling system for an extravehicular space suit.

According to the invention, an apparatus for removing heat energy of a cooling medium passing from a LCG is provided. The apparatus includes a heat sink assembly for absorbing the heat energy and a heat transfer means for transferring the heat energy of the cooling medium to the heat sink assembly. The heat transfer means regulates the quantity of heat energy transferred from the cooling medium to the heat sink assembly.

According further to the invention, the apparatus includes a heat sink assembly for absorbing and rejecting the heat energy and a heat transfer means for transferring the heat energy of the cooling medium to the heat sink assembly. The heat transfer means regulates the quantity of heat energy transferred from the cooling medium to the heat sink assembly.

According to a feature of the invention, the heat sink assembly is comprised of a phase change material, such as n-hexadecane paraffin, which capable of isothermally absorbing heat energy as it changes phase from a solid to a liquid.

According further to the invention, the paraffin is housed in a metallic matrix which distributes the heat energy throughout the paraffin and to an external heat rejection plate.

According further to the invention, the heat transfer means is comprised of a plurality of thermoelectric heat devices collectively acting as a heat pump.

Other features and advantages of the present invention will be apparent from the specification and claims and from the accompanying drawings.

BRIEF DESCRIPTION OF DRAWINGS

FIG. 1 is a perspective view of an extravehicular activity space suit;

FIG. 2 is a perspective view of a prior art liquid cooling garment for use in a space suit;

FIG. 4 is a cross-sectional, expanded view of the apparatus of FIG. 3.

BEST MODE FOR CARRYING OUT THE INVENTION

Figure 3:
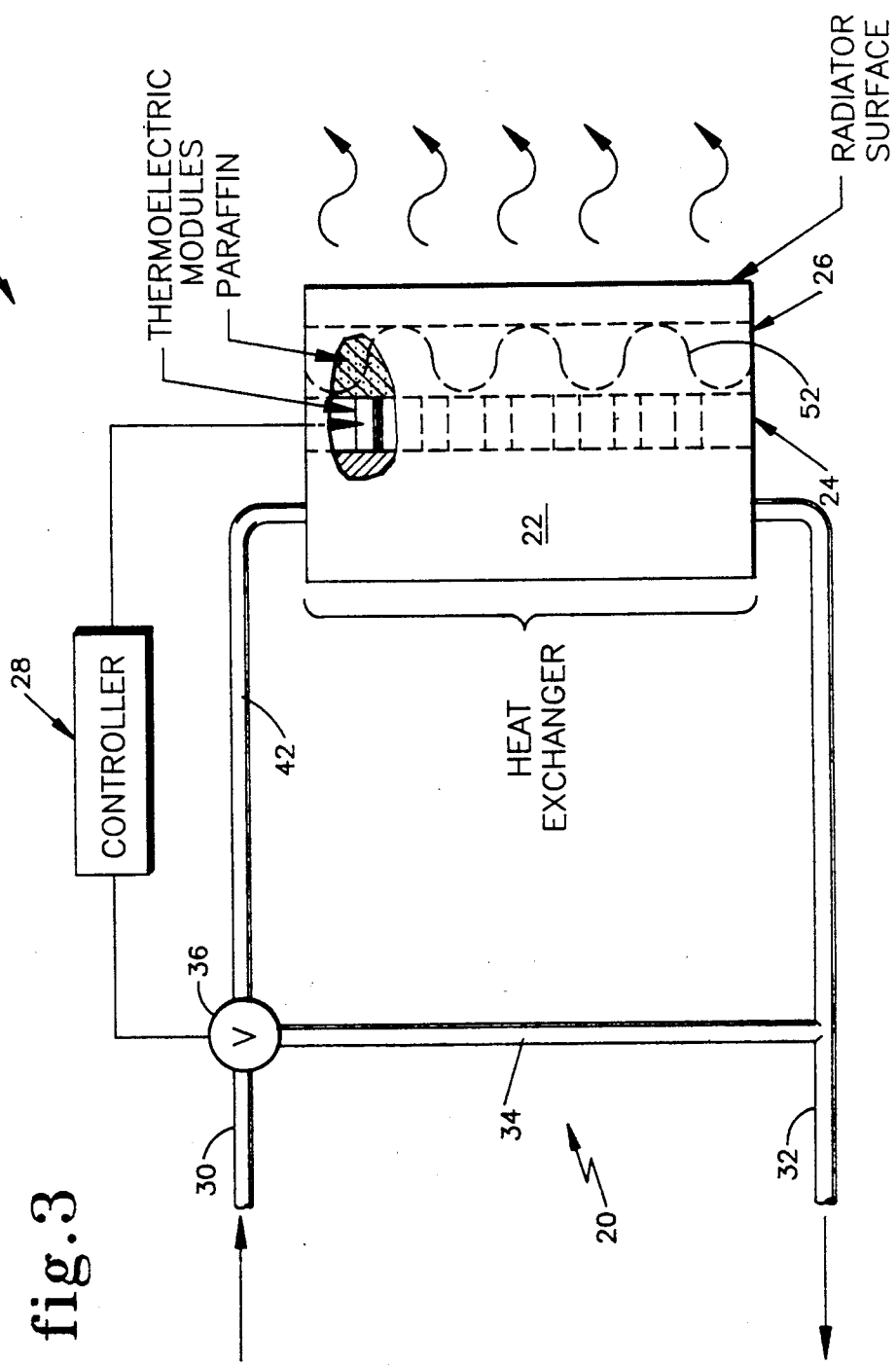
FIG. 3 is a schematic view of the cooling apparatus of the invention.

Referring to FIG. 1, a view of a space suit 10 employing the concepts of the present invention is illustrated. The space suit includes a life support pack 12. The life support pack includes the cooling system of the invention as will be discussed infra. The outer surface 14 of the pack provides for radiational cooling as will be discussed infra.

Referring to FIG. 2, a typical liquid cooling garment (LCG) 16, which is utilized to remove metabolic heat from the occupant of the space suit, is shown. A cooling medium (or fluid), such as water, is pumped into the garment and carries the waste heat from the garment to a cooling system. Such a liquid cooling garment is designed to operate with a total water flow rate of 240 pounds per hour to provide the proper environment for the suit occupant.

Referring to FIG. 3 a schematic of the cooling system 18 of the invention is shown. The cooling system consists of several major portions; a coolant loop 20, a heat exchanger 22, a heat pump 24, and a heat sink assembly 26. The apparatus is controlled by a controller 28.

The coolant loop 20 carries waste heat from the LCG 16 via line 30 to the cooling system. The cooling medium is circulated through the cooling system where the appropriate amount of heat energy is removed. The cooling medium is then returned to the LCG at the desired temperature via line 32. A bypass line 34 controls the amount of cooling medium directed to the cooling system as will be discussed infra. A valve 36 controls the flow through the bypass line as will be discussed infra.

Referring to FIG. 4, a cross-sectional view of a portion of the cooling system 18 is shown. The innermost layer (i.e. furthest from the external surface of the life support pack 12) is comprised of the heat exchanger 22. The heat exchanger consists of a plurality of tubes 38 nested within a heat distribution plate 40. The heat distribution plate is constructed of a thermally conductive material such as aluminum.

The tubes 38 receive the cooling medium from line 42 via a manifold (not shown) or the like. The tubing is disposed within a plurality of grooves 44 disposed within the heat distribution plate 40. The tubes are constructed of 304L-stainless steel and are bonded to the plate with thermally conductive RTV rubber. The heat distribution plate conducts and distributes heat from the relatively limited area of the tubes to a larger flat surface which contacts the heat pump 24.

The heat pump 24 consists of an electrically connected array of thermoelectric modules 46. The modules each act as a solid state electrically controlled heat pump, transferring heat from the distribution plate to the heat sink assembly.

The thermoelectric array may be controlled to augment or retard the normal conductive heat flow between the heat sink and the heat distribution plate. The thermoelectric array pumps heat energy with or against the prevailing temperature gradient by increasing a gradient in temperature between itself and a temperature of the cooling medium for absorbing heat energy therefrom, and increasing the gradient between itself and a temperature of the heat sink assembly for discharging heat energy to the heat sink assembly.

As is well known, a DC power supply may be operated by the controller to vary the voltage across the array to adjust the heat flux as desired. The power input to the thermoelectric modules 46 is dissipated as heat within the modules. Even when electrical power is not applied, the modules provide a conductive heat path.

The surfaces 48 of each of the thermoelectric modules are coated with a thin layer of thermally conductive silicone grease (not shown). The grease fills gaps resulting from minor dimensional variations to improve thermal performance.

The heat sink assembly 26 is comprised of a heat distribution panel 50, a matrix 52, a phase change material 54 and a radiator panel 56. The matrix and phase change material are sealed between the heat distribution panel and the radiator panel. The heat sink assembly absorbs heat from the thermoelectric modules, conducts heat into (or from) the enclosed phase change material, and conducts heat to the radiator panel, which is conditioned to optimize thermal radiation.

The heat distribution panel 50 is constructed of a thermally conductive material such as aluminum. The heat distribution panel conducts and distributes heat from the smaller area of the thermoelectric modules 46 to a larger flat surface which contacts the matrix 52 and phase change material 54.

The phase change material 54 may be any material which changes phase from about 40° to 65° F. A paraffin based substance or mixture is desirable. However, a pure n-hexadecane paraffin is preferred. Such material has the heat of fusion of 101.6 Btu/LB and a melting point of 64.2° F. Such material is ideal as its melting point lies near the average between highest and lowest required LCG water temperatures. At higher phase change temperatures, thermoelectric energy demand increases, while at lower temperatures, the radiation potential decreases moreover, n-hexadecane paraffin is essentially free from supercooling effects and expands and contracts minimally during phase change.

Since n-hexadecane paraffin is a relatively poor thermal conductor, the n-hexadecane paraffin is disposed within the matrix 52 to facilitate both the distribution of heat into the phase change material and the conduction of heat from the heat distribution panel to the radiator panel. The matrix is constructed of a thermally conductive open celled metallic foam such as aluminum. The matrix is bonded to the the heat distribution panel and the radiator panel by brazing or the like during fabrication. The paraffin is vacuum loaded into the heat sink assembly as a liquid through ports (not shown) at the ends (not shown) of each assembly.

The exterior surface of the radiation panel 26, which forms the outer surface 14 of the life support pack 12, is covered with a layer of adhesive-backed Teflon tape (see also 58 in FIG. 1). The tape is about 0.140 mm in thickness and has an inner coating of vacuum deposited silver. The tape optimizes the functioning of the outer surface as a radiator, having a solar absorptive to infrared emissivity ratio of 0.09. In addition, the surface of the Teflon tape is embossed with a diamond pattern to produce diffuse rather than specular reflections. The tape is manufactured by Sheldahl Inc., of Northfield, Minn.

The controller 28 maintains two primary modes of operation in the system: regeneration and cooling. Regeneration may occur either passively or actively. In passive regeneration, a cooling medium that has been chilled by a separate facility (not shown) is circulated through the cooling system 18 until the phase change material 54 changes phase from a liquid to a solid. Active (or accelerated) regeneration may be achieved by using the controller to apply voltage of appropriate polarity to increase the heat flow rate through the layer of thermoelectric modules 46 during the regeneration process. As above, the thermoelectric modules 46 act as a heat pump increasing the rate at which heat is removed from the phase change material.

In the cooling mode, the controller regulates the temperature of cooling medium supplied to the LCG 16. The controller can regulate absorption of heat energy from the cooling medium by either modulating the voltage applied to the thermoelectric modules 46, modulating the distribution of flow of the cooling medium between the cooling system and bypass line 34, or both. The controller commands the valve 36 to permit the cooling medium to flow entirely through the cooling system, to bypass the cooling system or to split the flow of the cooling medium through the bypass line 34 or the cooling system as required.

Generally, if the commanded LCG inlet temperature is lower than the paraffin melting temperature of 64.2° F. and/or the heat load is relatively high, the flow through the bypass line is closed, and heat rejection is controlled by modulation of voltage of the appropriate polarity to the thermoelectric modules as required.

If the commanded LCG inlet temperature is higher than the paraffin melting temperature and the heat load is relatively low, an appropriate flow of the cooling medium through the bypass line 34 is effected by the valve. The portion of the cooling medium passing through the heat exchanger 22 is cooled below the required degree. This portion of the flow is mixed with the cooling medium passing through the bypass line 34 to achieve the desired temperature.

The controller 28 may, if necessary, be made to power the thermoelectric modules 46 to actively heat the cooling medium passing through the heat exchanger 22 in the event that radiational heat rejection becomes excessive. This is generally a protective mode to prevent freezing of the cooling medium under abnormal circumstances.

It should be understood that the invention is not limited to the particular embodiments shown and described herein, but that various changes and modifications may be made without departing from the spirit and scope of the invention as defined by the following claims.

We claim:

1. A life support pack apparatus of the type worn during extravehicular activity in space, said life support pack apparatus including a cooling system for removing heat energy from a fluid circulating through a cooling garment worn by an occupant of an extravehicular space suit, said cooling system comprising:
   a heat sink assembly for absorbing said heat energy removed from said fluid circulating through the cooling garment worn by the occupant of the extravehicular space suit, said heat sink assembly including a phase change material for absorbing said heat energy upon changing phase from a solid to a liquid;
   a heat exchange assembly for collecting and distributing said heat energy from said fluid circulating through the cooling garment worn by the occupant of the extravehicular space suit, said heat exchange assembly including a heat distribution plate and means operatively associated with said heat distribution plate for passing said circulating fluid in heat exchange relationship with said heat distribution plate whereby said heat distribution plate collects said heat energy from said circulating fluid;
   heat pump means operatively disposed between said heat sink assembly and said heat distribution plate, said heat pump means for controlling the transfer of said heat energy from said heat distribution plate to said heat sink assembly; and
   means for rejecting by radiation said heat energy from said heat sink assembly in a vacuum environment in space.

2. The apparatus of claim 1 wherein said material comprises:
   a paraffin based substance having a distinct phase change at a temperature in the range of 40° to 65° F.

3. The apparatus of claim 2 wherein said paraffin based substance comprises:
   n-hexadecane.

4. The apparatus of claim 1 wherein said heat sink assembly further comprises:
   means for facilitating heat energy distribution from said heat transfer means throughout said material 5. The apparatus of claim 4 wherein means for distributing heat energy further comprises:
   a thermally conductive matrix.

6. Apparatus for removing heat energy from a fluid, said apparatus comprising:
   a heat sink assembly for absorbing said heat energy, said heat sink assembly including a material for absorbing said heat energy upon changing phase from a solid to a liquid and a thermally conductive matrix within which said material is disposed for facilitating distribution of said heat energy throughout said material;
   a heat transfer means for controlling the transfer of said heat energy from the fluid to said heat sink assembly, said heat transfer means comprising a heat pump having an array of thermoelectric modules; and
   means for rejecting by radiation said heat energy from said heat sink assembly in a vacuum environment.

7. The apparatus of claim 6, wherein said material comprises:
   a material which isothermally absorbs heat energy upon change of phase from a solid to a liquid.

8. The apparatus of claim 7, wherein said material comprises:
   a substance having a distinct phase change at a temperature in the range of 40° to 65° F.

9. The apparatus of claim 8, wherein said substance comprises primarily n-hexadecane.

10. Apparatus for removing heat energy from a fluid, said apparatus comprising:
    a heat sink assembly for absorbing said heat energy, said heat sink assembly including a material for absorbing said heat energy upon changing phase from a solid to a liquid;
    a heat transfer means for controlling the transfer of said heat energy from the fluid to said heat sink assembly, said heat transfer means comprising a heat pump having an array of thermoelectric modules; and
    means for rejecting by radiation said heat energy from said heat sink assembly in a vacuum environment, said radiation means having
    an outer surface comprised of a Teflon coating, said Teflon coating having an inner coating of vacuum deposited silver.

11. The apparatus of claim 10, wherein said Teflon coating further comprises:
    an outer coating embossed with a diamond pattern, said diamond pattern producing diffuse rather than specular reflections.

12. The apparatus of claim 6, further comprising:
    means for varying a voltage across said array of thermoelectric modules, said varying voltage modulating the quantity of said heat energy transferred by said modules.

* * * * *